United States Patent
Jogo (10) Patent No.: US 7,209,149 B2
(45) Date of Patent: Apr. 24, 2007

(54) IMAGE CROPPING AND SYNTHESIZING METHOD, AND IMAGING APPARATUS

(75) Inventor: Naozumi Jogo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 495 days.

(21) Appl. No.: 09/873,388

(22) Filed: Jun. 5, 2001

(65) Prior Publication Data

US 2001/0048447 A1 Dec. 6, 2001

(30) Foreign Application Priority Data

Jun. 5, 2000 (JP) ............................. 2000-167319

(51) Int. Cl.
  *G09G 5/00* (2006.01)
(52) U.S. Cl. .................... 345/622; 345/619; 345/620; 345/629; 345/662
(58) Field of Classification Search ................ 345/620, 345/622, 624, 629, 634, 637, 619, 662, 667, 345/641; 382/282–284
See application file for complete search history.

(56) References Cited

U.S. PATENT DOCUMENTS

| | | | |
|---|---|---|---|
| 5,592,305 A * | 1/1997 | Iwadate et al. ............. | 358/448 |
| 5,745,664 A * | 4/1998 | Nomura et al. ............. | 358/1.18 |
| 5,870,771 A * | 2/1999 | Oberg ........................ | 715/502 |
| 6,195,101 B1 * | 2/2001 | Ghislain Bossut et al. . | 345/629 |
| 6,201,548 B1 * | 3/2001 | Cariffe et al. .............. | 345/620 |
| 6,282,330 B1 * | 8/2001 | Yokota et al. .............. | 382/309 |
| 6,326,983 B1 * | 12/2001 | Venable et al. ............ | 715/763 |
| 6,393,162 B1 * | 5/2002 | Higurashi ................... | 382/284 |
| 6,424,752 B1 * | 7/2002 | Katayama et al. .......... | 382/284 |
| 6,441,827 B1 * | 8/2002 | Hori et al. .................. | 345/629 |
| 6,557,017 B1 * | 4/2003 | Venable ...................... | 715/502 |
| 6,654,506 B1 * | 11/2003 | Luo et al. ................... | 382/282 |
| 2001/0026371 A1 * | 10/2001 | Nozaki ........................ | 358/1.1 |
| 2001/0035875 A1 * | 11/2001 | Suzuki et al. ............... | 345/723 |

* cited by examiner

*Primary Examiner*—Kee M. Tung
*Assistant Examiner*—Chante Harrison
(74) *Attorney, Agent, or Firm*—Sughrue Mion, PLLC (57) ABSTRACT

By selecting a template, a crop boundary (98a) is displayed on an image on a screen. The crop boundary has a corresponding shape to that of a frame of the selected template, and is variable in size while keeping the same shape and being centered on a reference point (98e). Upper and lower horizontal lines (98b, 98c) are also displayed inside the crop boundary to define an internal zone (98d), and the center point on the upper horizontal line is defined as the reference point. By placing the reference point on the top of the head of a human subject contained in the displayed image and then moving the lower horizontal line to align it with the chin, the internal zone is adjusted to the head of the human subject. In cooperation with the movement of the lower reference line, the crop boundary is automatically enlarged or reduced so as to keep the internal zone in a predetermined proportion and position relative to the crop boundary.

24 Claims, 10 Drawing Sheets

2×4 FRAMES / 5.6×3.6 / A5

FIG.6B

1×4 FRAMES / 5.6×4.6 / A5

FIG.6C

1×4 FRAMES / 6.1×4.6 / A5

FIG.6D

2×3 FRAMES / 5.4×5.4
3.5×3.0 / A5

FIG.6E

1×8 FRAMES / 4.5×3.5 / A5

FIG.6F

1×8 FRAMES / 5.0×4.0 / A5

IMAGE CROPPING AND SYNTHESIZING METHOD, AND IMAGING APPARATUS

BACKGROUND OF THE INVENTION

1. Field of the Invention

The present invention relates to an image cropping and synthesizing method, and more particularly to a method of cropping an image and synthesizing the cropped image with a template. The present invention relates also to an imaging apparatus for the image cropping and synthesizing method.

2. Background Arts

An imaging system has been known in the art, wherein electronic images are taken out from different kinds of storage media, and are processed for correcting the image quality or for synthesizing with an optional template image, to print out hard copies of the electronic images. The imaging system consists of image input devices, a computer and a printer. As the image input devices, there are a reflective scanner that reads out electronic images from reflective originals, such as a photo-print printed on photographic paper and other kinds of printed matters printed on reflective recording material, a film scanner that reads out electronic images from negative or positive film, and a card reader that reads out digital image data from a storage card. The digital image data is picked up through an electronic still camera or digital camera. The computer processes the image data from the image input device, and the printer prints out hard copies based on the processed image data.

The conventional imaging system is provided with templates for ID photographs that are used for driver's licenses, passports, and many other kinds of identification papers and license papers. Since the format and the requisite number of copies of an identical ID photograph vary depending upon what kind of identification paper the portrait is needed for, different kinds of templates are prepared for different kinds of ID papers in the imaging system. Thereby, the requisite number of copies of the same ID photograph may be printed on a sheet of recording paper in the designated format just by synthesizing the input image with an appropriate one of the prepared template. Among the different kinds of ID photographs, that for the passport is most strictly designated in format: not only the sheet size of each ID photograph is designated, but also the position and the size of the human face are designated relative to the four sides of each ID photograph.

In the conventional imaging system, a crop boundary is displayed on a monitor with an image to be used for the ID photograph, such that the size of the crop boundary is changeable within the image, for bounding an area of the image, designating the area to synthesize with a template. While observing the monitor, the operator reduces or enlarges the crop boundary, or displaces it relative to the image, to designate the area to synthesize. Accordingly, it requires some skill or several trial and error to synthesize the image with the template properly, and thus this operation has been time consuming.

SUMMARY OF THE INVENTION

In view of the foregoing, an object of the present invention is to provide an image cropping and synthesizing method and an apparatus therefor, that facilitate cropping and synthesizing an image with a template in a proper format.

According to an aspect of the present invention, a method of cropping and synthesizing an image on a screen comprises the steps of displaying a crop boundary with a reference point on an image to synthesize on the screen, upon selecting a template having at least a frame, the crop boundary having a corresponding shape to that of the frame of the selected template and being variable in size while keeping the same shape and being centered on the reference point; moving the crop boundary on the screen through an operation device, to position the reference point of the crop boundary on an appropriate point of the image to synthesize; thereafter enlarging or reducing the crop boundary about the reference point, to bound an appropriate area of the image to synthesize; cropping an image of the bounded area; and pasting the cropped image in the frame of the template after enlarging or reducing the cropped image in accordance with the size of the frame of the template.

Since the crop boundary having the corresponding shape to that of the frame of the selected template is displayed on the image to synthesize, and the crop boundary is variable in size while keeping the same shape and being centered on the reference point, and also the size of the cropped image is automatically adjusted to the frame size, an appropriate area of the image may easily be synthesized in a proper format with the selected template, even while the operator is not skilled in the image synthesizing.

According to another aspect of the present invention, an image cropping method comprises the steps of displaying an image on the screen; displaying a crop boundary with a reference point on the image on the screen, upon designating a frame size, the crop boundary having an equal aspect ratio to that of the designated frame size and being variable in size while keeping the same aspect ratio and being centered on the reference point; displaying reference lines inside the crop boundary, to define an internal zone within the crop boundary, the internal zone having a predetermined proportion and a predetermined position relative to the crop boundary; moving the crop boundary together with the reference lines on the screen through an operation device, to position the reference point of the crop boundary on an appropriate point of the image; moving at least one of the reference lines on the screen through the operation device while keeping the reference point on the appropriate point of the image to synthesize, to adjust the internal zone to a portion of the image; enlarging or reducing the crop boundary about the reference point automatically in cooperation with the movement of the reference line, so as to keep the internal zone in the predetermined proportion and position relative to the crop boundary; cropping an image of an area of the image that is bounded by the crop boundary; and enlarging or reducing the cropped image in accordance with the frame size.

Since the crop boundary is automatically enlarged or reduced in cooperation with the change in size of the internal zone, and thus the internal zone is kept in the predetermined proportion and position relative to the crop boundary, it becomes easy to layout a portion of the image, e.g. the head of a human subject, in a designated size and on a designated position relative to the outline of the frame. This configuration is preferable especially for producing such ID photographs where the layout of the human subject inside each ID photograph is strictly defined.

An imaging apparatus of the present invention comprises:

a template selecting device for selecting a template having at least a frame from among different kinds of templates;

a display device for displaying an image to synthesize and a crop boundary having a corresponding shape to that of the frame of the selected template;

an operation device for moving the crop boundary on the screen, to position a reference point of the crop boundary on an appropriate point of the image to synthesize, and for enlarging or reducing the crop boundary about the predetermined reference point while keeping the crop boundary in the same shape and keeping the reference point on the appropriate point of the image;

a cropping device for cropping an image from an area of the image to synthesize, the area being bounded by the crop boundary; and an image synthesizing device for enlarging or reducing the cropped image in accordance with the size of the frame of the template, and thereafter pasting the cropped image in the frame of the template, to produce a synthesized image.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
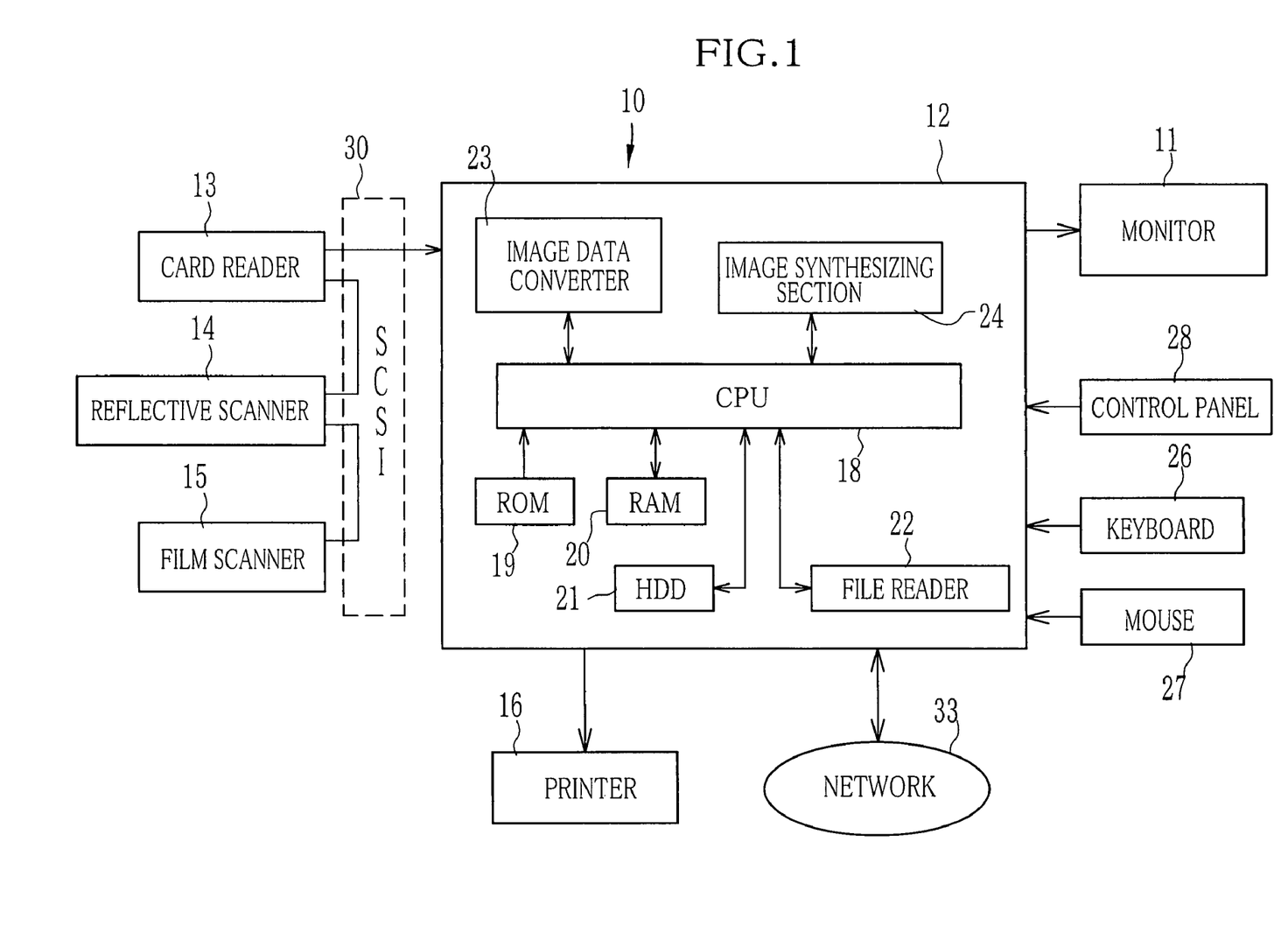
FIG. 1 is a block diagram illustrating an imaging system according to an embodiment of the present invention.

In FIG. 1, an imaging system 10 is mainly constituted of a personal computer 12, a monitor 11 as a display device, and a card reader 13, a reflective scanner 14 and a film scanner 15 as image input devices, and a printer 16. The monitor 11, the image input devices 13 to 15 and the printer 16 are connected to the personal computer 12. The printer 16 prints out hard copies of images processed in the personal computer 12. In this embodiment, the printer 16 is of a type that uses a heat-developing photosensitive recording material.

The personal computer 12 consists of a CPU 18, a ROM 19, a RAM 20, a hard disc drive (HDD) 21, a file reader 22, an image data converter 23 and an image synthesizing section 24. For example, the file reader 22 is a floppy disc drive, and may read out image data from a floppy disc. In that case, the file reader 22 is used as an image input device.

A keyboard 26, a mouse 27 and a control panel 28 are also connected to the personal computer 12. The keyboard 26 is used for installing software-programs in the personal computer 12, setting up various parameters in the personal computer 12, or for maintenance. The control panel 28 is provided with operation buttons specific for controlling the imaging system 10, so the mouse 27 and the control panel 28 are used for imaging and processing.

The card reader 13, the reflective scanner 14 and the film scanner 15 are connected in cascade to the personal computer 12 through a SCSI interface 30 that is provided in the personal computer 12. The card reader 13 may read out image data from a storage card as it is put in the card reader 13. In this embodiment, the image data is assumed to be picked up and recorded on the storage card by an electronic still camera that may be called a digital camera.

The reflective scanner 14 is for reading out electronic images from reflective originals, such as photo-prints, instant photographs recorded on self-developing type photo film sheet, and printed matters. For example, the reflective scanner 14 is a flat-head type that scans a line sensor across a reflective original as placed on a reading stage, to read out an image from the entire surface of the reflective original. The film scanner 15 is for reading out an image from a light-permeable material, such as negative or positive photo film. When the image is read out from the negative, the film scanner 15 converts it into a positive image before inputting it in the personal computer 12.

The personal computer 12 is connected to a network 33, such as a LAN (Local Area Network) or the Internet. Through the network 33, the imaging system 10 can share the same data with and cooperate with other imaging systems installed in a photo-lab, or receive image data from a client. On communicating image data through the Internet, the image data is converted into a ciphered code, so that the image data may be accessible only for particular persons. In ciphering, accessible ranges are classified in a pyramid style, so that the right to access is given to those belonging to upper classes than a designated class.

The image data input through the respective image input devices 13 to 15 is sent to the image data converter 23. The image data converter 23 consists of a color correction circuit and a gradation processing circuit. The color correction circuit controls the color balance of the input image, taking different spectral characteristics between these image input devices 13 to 15 into consideration. Concretely, the color correction circuit carries out γ-correction on red, green and blue (RGB) color signals of the image data with correction coefficients that are predetermined for the respective image input devices 13 to 15.

The gradation processing circuit corrects gradation of the image data by use of one of a plurality of look-up tables (LUT) which are prepared for the respective image input devices 13 to 15, such that the gradation is well reproduced by the printer 16 of the imaging system 10. After correcting the gradation, the gradation processing circuit converts the image data into the YMC form (masking), and write it on the RAM 20.

Since the different kinds of reflective originals, including photo-prints, printed matters and instant photographs, use different color materials, more than one LUT is prepared for the reflective scanner 14, each LUT being prepared for one type of color material. By designating the kind of the reflective original the reflective scanner 14 is going to scan, one of the LUTs that is suitable for the color material used in the designated original is used for the gradation correction. Also for the film scanner 15, two types of LUTs are prepared: one for the negative film and the other for the positive film.

The film scanner 15 is provided with a pre-scan mode and a fine scan mode. The pre-scan mode is to input image data in the personal computer 12 for the sake of displaying an image on the monitor 11. The fine scan mode is to input image data for the sake of printing an image. In the pre-scan mode, the image data converter 23 corrects color and gradation of the input image data, and the results of correction are reflected by the image displayed on the monitor 11. In the fine scan mode, correction parameters applied to the image data during the pre-scan mode are transferred to an image data converter built in the film scanner 15, so the γ-conversion and the gradation correction of the image data is performed in the film scanner 15 on the basis of the correction parameters. That is, the image data bypasses the image data converter 23 of the personal computer 12, when it is written on the RAM 20 in the fine scan mode.

The image synthesizing section 24 performs a variety of image processing operations, like magnification changing of a selected image, cropping and synthesizing with a template.

Figure 2:
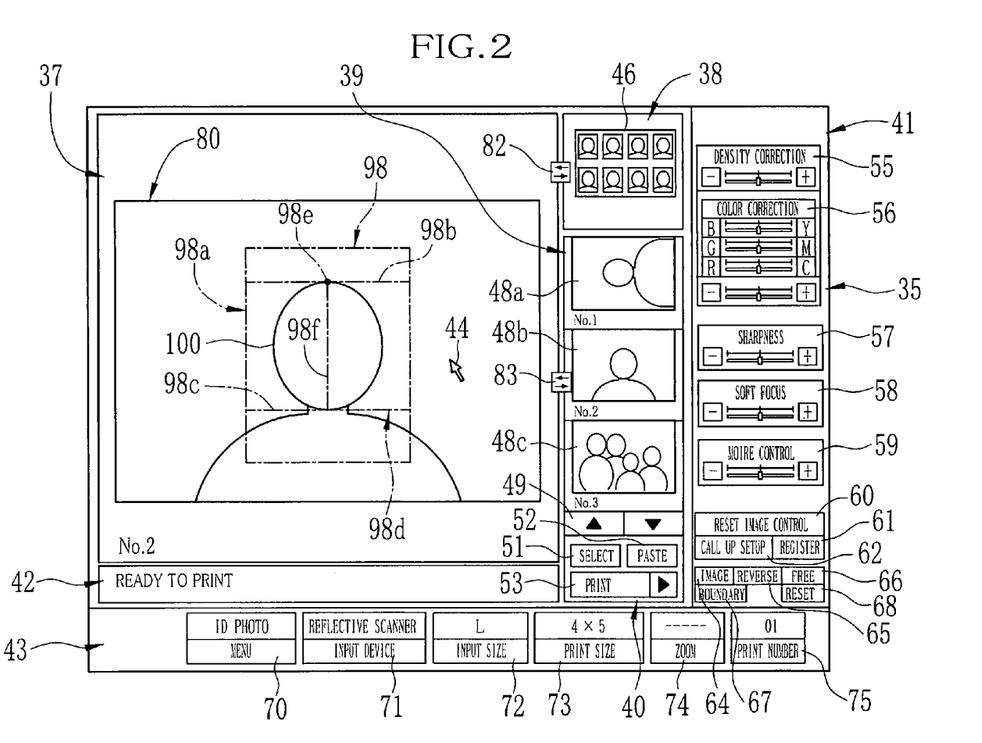
FIG. 2 is an explanatory diagram illustrating a control screen for image processing, that is displayed on a monitor of the imaging system.

Image processing software specific for the imaging system 10 is installed in the personal computer 12, for permitting processing and synthesizing image data. The image data converter 23 and the image synthesizing section 24 are activated by starting up the image processing software. When the image processing software is started up, a corresponding control screen 35 appears on the monitor 11, as shown in FIG. 2, so the operator of the imaging system may operate functional buttons on the control screen 35 by use of the mouse 27 or the control panel 28, to work the imaging system 10.

The control screen 35 of the image processing software is of a fixed multi-window type that adopts Graphical User Interface (GUI) in a number of working areas whose positions and sizes are fixed. The control screen 35 consists of a largest main display area 37, first and second sub display areas 38 and 39 and a main control command display area 40 which are located on the right side of the main display area 37, an image quality control area 41 on the right side of these areas 38 to 40, a message display area 42 and a menu selection display area 43 which are located on the bottom of the control screen 35. A cursor or pointer 44 is also displayed on the control screen 35. The pointer 44 is movable through the mouse 27 or the control panel 28.

The main display area 37 is a work area where an image 80 to synthesize is displayed in a large size for image-processing, such as modifying or correcting the image or the image quality, synthesizing the image with another image. The first sub display area 38 is a print preview area for displaying an image simulating a printed condition in a reduced size. For example when a selected template is for printing eight frames of an identical image on a sheet of recording paper, a corresponding layout image 46 is displayed on the first sub display area 38 in a reduced size.

Since the operator can confirm the layout of the printing image on the first sub display area 38, the operator can always select an appropriate template. This function is convenient especially when a number of different images are to be synthesized by pasting them in a template with a plurality frames, the operator can check the arrangement of the pasted images on the first sub display area 38.

The second sub display area 39 is a thumbnail display area where a number of thumbnails of images may be displayed when image data of those images is read in the personal computer 12. Three vertically arranged thumbnails 48a, 48b and 48c are displayed at a time in this embodiment. Any of the thumbnails 48a to 48c displayed on the second sub display area 39 may be selected to be synthesized, and the image corresponding to the selected thumbnail is displayed on the main display area 37.

As a storage card usually stores image data of more than three image frames, there is a need for displaying more than three images as input images on the second sub display area 39. In that case, a pair of scroll buttons 49 are displayed on the bottom of the second sub display area 39, to permit scrolling the thumbnails up and down and thereby displaying all of the input images in turns.

The main control command display area 40 displays a selection button 51, a pasting button 52 and a print button 53. The selection button 51 is used for selecting the image to synthesize from among the thumbnails 48a to 48c displayed on the second sub display area 39. The selection button 51 doubles as a read-in button, and servers as the read-in button so long as any image is not read in the personal computer 12. In that case, an indicia "READ-IN" is displayed on this button 51 instead of "SELECT". By clicking on the read-in button 51, image data is read out through the card reader 13, or the reflective scanner 14, or the film scanner 15. Because the reflective scanner 14 usually reads out a single image at a time, the image read out through the reflective scanner 14 may be regarded as the image 80 to synthesize, and automatically displayed in the large size on the main display area 37.

The pasting button 60 is operated to paste the selected image in a template. In that case, the selected image is pasted as a whole, or after being cropped. The print button 61 is operated to activate the printer 16 to print an image based on the image data as processed for quality control or image synthesizing or the like.

The image quality control area 41 displays control buttons or sliders 55, 56, 57, 58 and 59 for manual image quality control, including density control, color control, sharpness control, soft focus effect control and moire control. The control buttons are operated by clicking the pointer 44 thereon, whereas the sliders are operated by dragging their knobs to an appropriate position.

Provided below the image quality control area 41 are a reset button 60 for resetting the previous setup values for the image quality control, a register button 61 for registering setup values for the image quality control, and a call up button 62 for calling up registered setup values. The call up button 62 allows to use the setup values for the image quality control repeatedly after once they are setup, and thus improves work efficiency.

Below these buttons 60 to 62 for the image quality control, there are provided an image turning button 64 for turning the image through 90 degrees on the main display area 37, an image reverse button 65 for reversing the image on the main display area 37 left-to-right, a free cropping button 66 for changing aspect ratio of a boundary for cropping, a boundary turning button 67 for turning the direction of the crop boundary through 90 degrees, and a reset button 68 for canceling designation of a cropping area by the crop boundary.

The menu selection display area 43 displays a menu button 70, an input selection button 71, an input size button 72, a print size button 73, a zoom button 74 and a print number button 75. For example, a list of menu options pops up from the menu button 70 upon clicking on the menu button 70. By clicking on one of the menu options, the image processing software is switched to a job mode corresponding to the selected menu option. As exemplars of job modes selectable by the menu button 70, the present embodiment offers a digital camera index mode, a digital camera processing-printing mode, an album mounting mode, and an ID photo mode.

The digital camera index mode is selected to produce an index print, wherein all of images which are recorded on a storage card and read out through the card reader 13 are printed on a sheet of recording paper, after being reduced in size and arranged in a matrix. Different kinds of templates are prepared for this mode, and is selected according to the number of images to be contained in an index print.

The digital camera processing-printing mode is selected when it is necessary to print out hard copies of the processed image data immediately after the image data picked up through a digital camera is processed. In this mode, a template with four frames is used for a A4 size recording sheet, and a template with two frames is used for a A5 size recording sheet.

The album mounting mode is for printing a plurality of images on a recording sheet in appropriate layout and arrangement, just like the mounting on an album. So a file of these recording sheets serves directly as an album. Also for this mode, some templates are prepared. For example, there are a template for arranging four images of the same size on one sheet, a template for arranging one large image and two smaller images on one sheet, and a template for arranging a couple of large images on one sheet. In the ID photo mode, ID photographs for many kinds of official application papers may be produced.

The input selection button 71 is operated to select the input device for inputting the image data. A list of selectable input devices pops up from the input selection button 71 upon clicking on the input selection button 71. As the selectable input devices, those connected to the imaging system 10 are listed up, i.e. the card reader 13, the reflective scanner 14, the film scanner 15 and the file reader 22 in the present embodiment.

When the reflective scanner 14 or the film scanner 15 is selected by the input selection button 71, a list of different kinds of originals to scan is further displayed: a photo-print, a printed matter, an instant photograph, a negative photo film, a positive photo film, and so forth. Then, the operator selects one from among the list in correspondence with the actual original to scan. Then, the color correction circuit and the gradation processing circuit of the image data converter 23 carry out proper corrections for the image data with regard to color materials used in the selected kind of original. It is possible for the operator to register other kinds of originals.

The input size button 72 is used for entering the size of an original when the original is to be scanned through the reflective scanner 14. A list of size options for the original pops up from the input size button 72 upon clicking on this button 72, so the operator may select the size of the original. Then, the reflective scanner 14 scans a range determined by the selected size of the original.

The print size button 73 is operated for selecting the sheet size of recording paper for printing, or for selecting a template. Upon clicking on the print size button 73, a list of paper size options and template options pops up from this button 73. Since there are a large number of templates stored in the imaging system 10, the list of template options popping up from the print size button 73 is switched over according to the job mode selected by the menu button 70. For example, those templates having a lot of frames and usable for the index printing are listed up in the digital camera index mode, whereas those templates for the driver's license, the passport and other kinds of ID papers are listed up in the ID photo mode.

Figure 3:
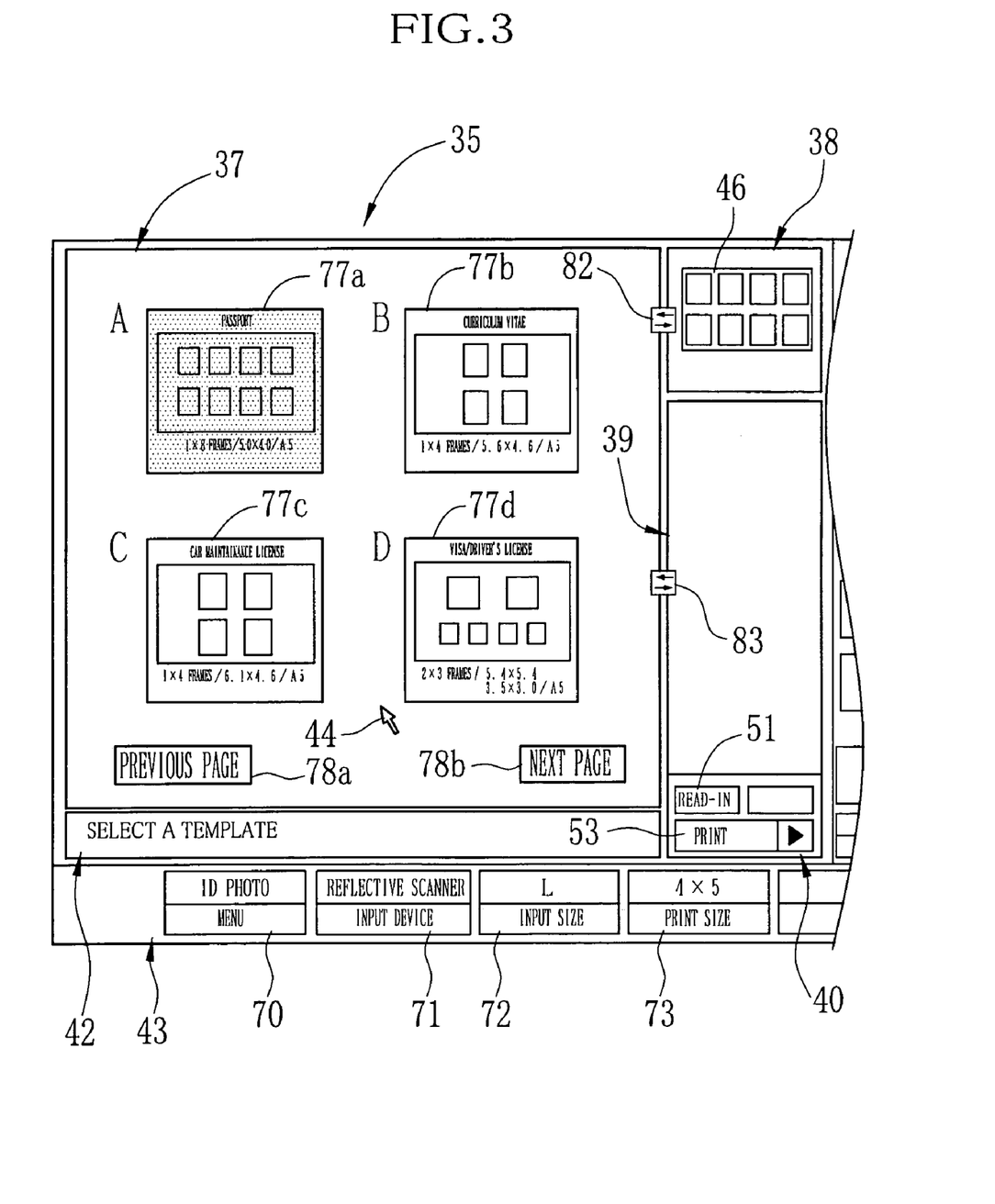
FIG. 3 is an explanatory diagram illustrating an example of display condition on the control screen, that is used for selecting a template.
Figure 4:
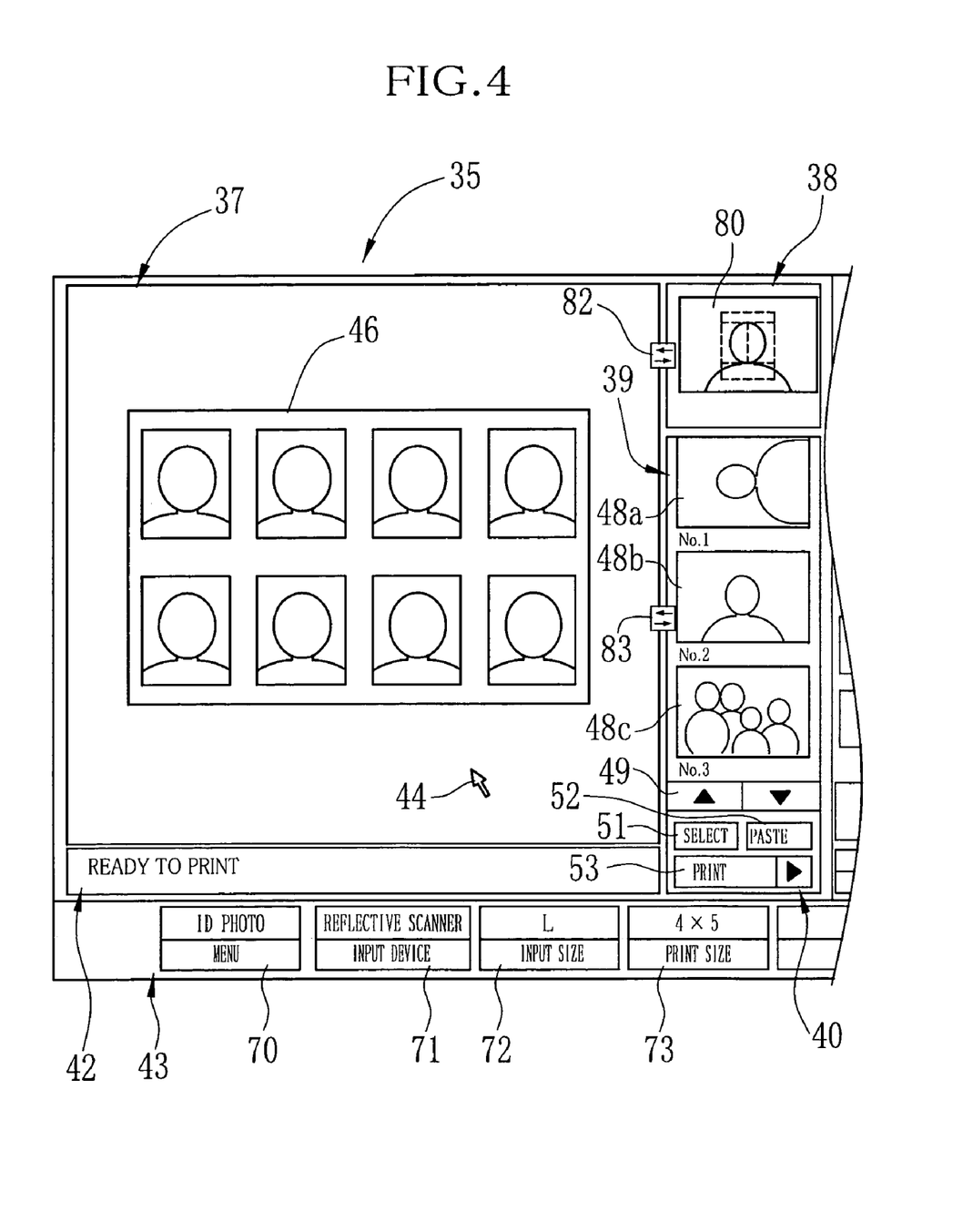
FIG. 4 is an explanatory diagram illustrating an example of display condition on the control screen, that appears when the display contents are interchanged between a main display area and a first sub display area.

Besides the above procedure for selecting the template, the template may be selected more visually by clicking on one of samples 77a, 77b, 77c and 77d as displayed on the main display area 37, as shown in FIG. 3, wherein each sample shows an outline of one template in a reduced size. In the present embodiment, the number of samples 77a to 77d displayed at once on the main display area 37 is four. In those job modes where the number of available templates is more than four, a pair of page scrolling buttons 78a and 78b are displayed on the bottom of the main display area 37, so that the operator may view all the available templates successively on the main display area 37.

The zoom button 74 is for zooming the image up and down on the main display area 37. The print number button 75 is for designating the number of copies to print. These operation buttons 70 to 75 are each divided into upper and lower halves, and the allocated function is indicated on the lower half, whereas the presently selected option is indicated on the upper half.

The message display area 42 displays messages relating to the presently executed operation or job, information on the operation or the job that can be executed next, or hints for the next operation. The message display area 42 also displays an appropriate error message in case of necessity.

Figure 5:
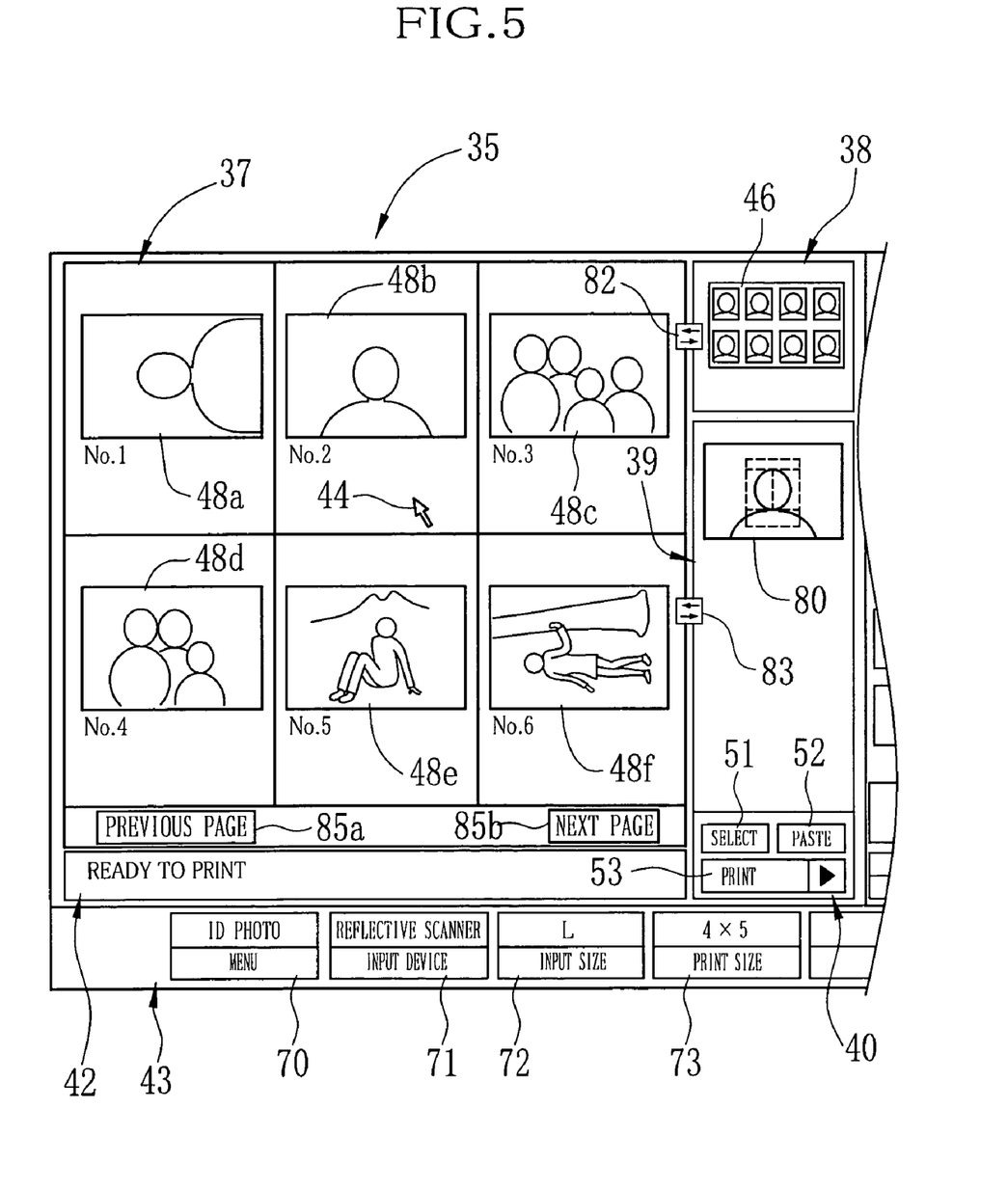
FIG. 5 is an explanatory diagram illustrating an example of display condition on the control screen, that appears when the display contents are interchanged between the main display area and a second sub display area.

A first display interchange button 82 is provided on a border between the main display area 37 and the first sub display area 38, and a second display interchange button 83 is provided on a border between the main display area 37 and the second sub display area 39. For instance, when the first display interchange button 82 is operated in a condition where the image 80 to synthesize is displayed on the main display area 37 and the layout image 46 is displayed on the first sub display area 38, as shown in FIG. 2, then the image 80 to synthesize is displayed in a reduced size on the first sub display area 38, and the layout image 46 is displayed in an enlarged size on the main display area 37. In the same way, if the second display interchange button 83 is operated in the condition as shown in FIG. 2, the displayed contents are interchanged between the main display area 37 and the second sub display area 39, as shown in FIG. 5. At that time, six of the thumbnails 48a to 48f may be displayed at once on the main display area 37, making full use of the large main display area 37. If there are more than six images to display as the thumbnails, a pair of page scrolling buttons 85 are displayed on the bottom side of the main display area 37.

With the first and second display interchange buttons 82 and 83, the small images displayed on the first or the second sub display area 38 or 39 can be quickly displayed in an enlarged size on the main display area 37, so these buttons 82 and 83 are very convenient for the sake of confirming the detail of the small images.

Since image processing software used for conventional imaging systems adopts a control screen of a floating multi-window type where a plurality of display areas or windows normally lie in layers on the control screen, it is necessary to switch over the windows one another for viewing the windows in the lower layers. To display all of the windows simultaneously on the control screen, it is necessary modifying the sizes of the respective windows and rearranging the windows. The conventional imaging systems are not handy. On the contrary, since the display areas 37 to 43 are fixedly displayed on the fixed multi-window type control screen 35 used in the imaging software according to the present embodiment permits viewing all the display areas any time without the need for complicated operation. Furthermore, the first and second display interchange button 82 and 83 make it easier to enlarge or reduce the size of the display area in comparison with the floating multi-window type control screen.

Figure 6A:
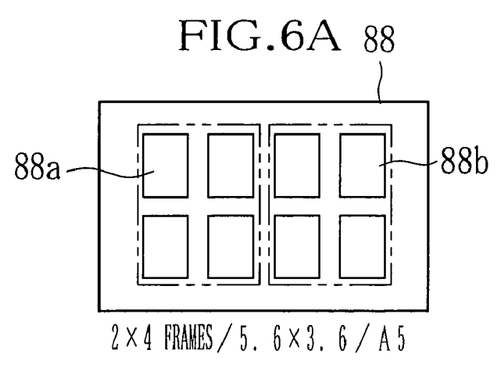
FIGS. 6A, 6B, 6C, 6D, 6E and 6F are explanatory diagrams illustrating examples of templates for ID photographs.
Figure 6B:
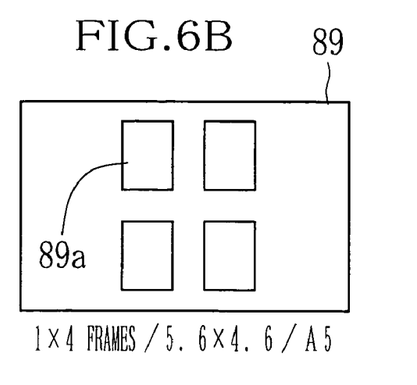
Figure 6C:
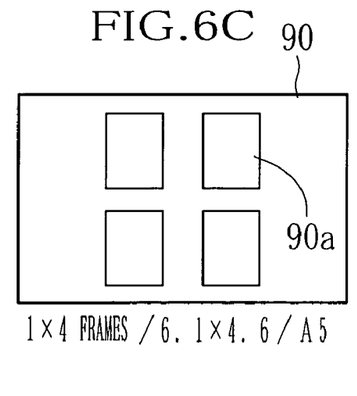

FIGS. 6A to 6F show examples of the templates 88, 89, 90, 91, 92 and 93 available in the "ID photo mode". Any of the templates 88 to 93 are determined to use the A5-size paper for printing. The template 88 shown in FIG. 6A is for the disaster prevention manager's license, and provided with eight frames of 5.6 cm×3.6 cm. With the template 88, an image or portrait may be pasted in the left four frames 88*a*, whereas another image or portrait may be pasted in the right four frames 88*b*. The template 89 shown in FIG. 6B is for the curriculum vitae or for the application papers for Government employees, and provided with four frames 89*a* of 5.6 cm×4.6 cm. The template 90 shown in FIG. 6C is for the car maintenance engineer's license, provided with four frames 90*a* of 6.1 cm×4.6 cm. With the template 89 or 90, an image or portrait may be pasted in these four frames.

Figure 6D:
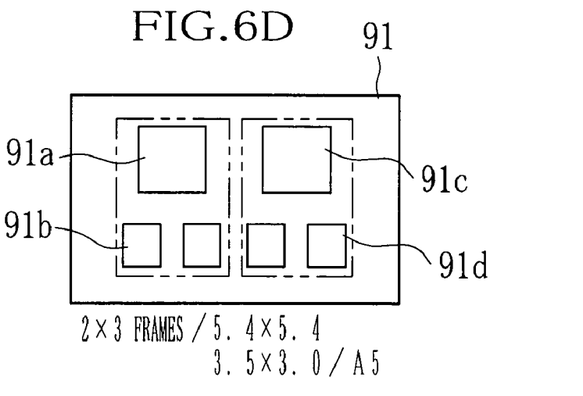
Figure 6E:
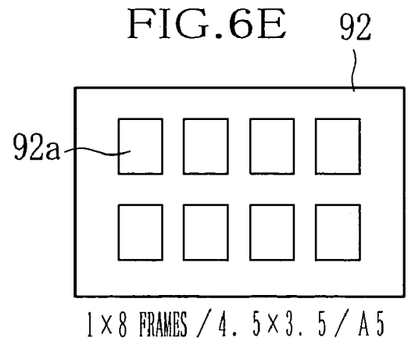
Figure 6F:
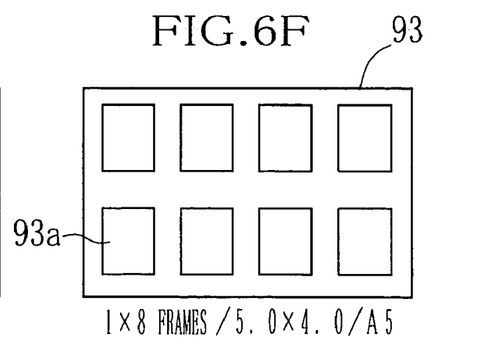

The template 91 shown in FIG. 6D is for the visa and the driver's license, provided with two large frames 91*a* and 91*c* of 5.4 cm×5.4 cm and four small frames 91*b* and 91*d* of 3.5 ×cm×3.0 cm. With the template 91, an image or portrait may be pasted in one large frame 91*a* and the two small frames 91*b*, whereas another image or portrait may be pasted in the other large frame 91*c* and the remaining two small frames 91*d*. The template 92 shown in FIG. 6E is for the license of first-class architect, provided with eight frames 92*a* of 4.5 cm×3.5 cm. With the template 92, an image or portrait is pasted in these eight frames 92*a*. The template 93 shown in FIG. 6F is for the passport, provided with eight frames 92*a* of 5.0 cm×4.0 cm. With the template 93, an image or portrait is pasted in these eight frames 93*a*.

It is to be noted that the personal computer 12 stores many other templates than the illustrated ones. It is possible to use A5-wide type paper sheets as the recording paper, and there are a variety of templates prepared for the A5-wide type.

Figure 7:
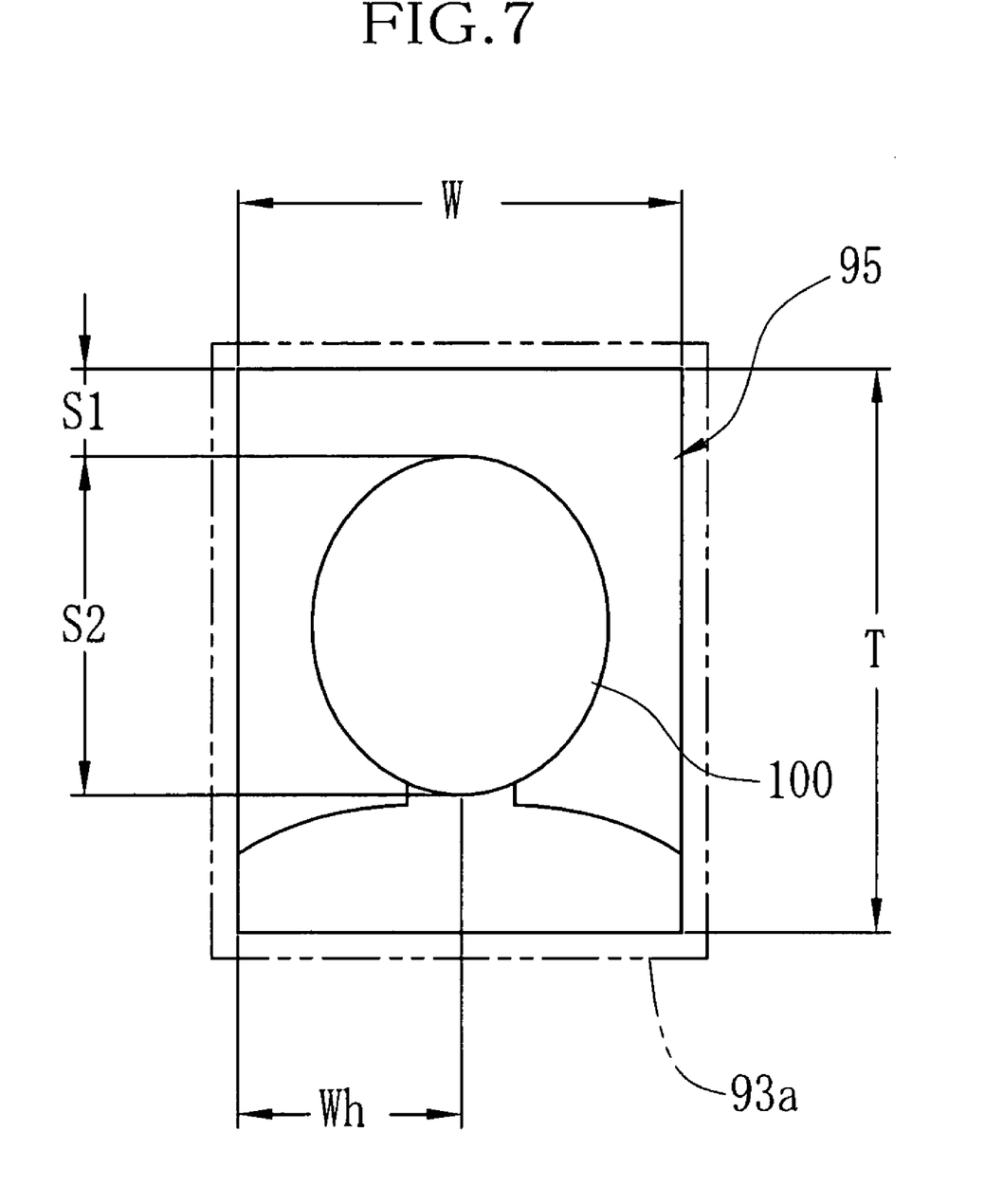
FIG. 7 is an explanatory diagram illustrating the format of the ID photograph for the passport.

As mentioned above, not only the outline size of the ID photograph but also the size and position of the portrait contained in the ID photograph are strictly designated for use in the passport. As shown in FIG. 7, the ID photograph 95 for the passport is defined to have a size of 4.5 cm×3.5 cm, wherein the height H=4.5 cm and the width W=3.5 cm. That is, the frame 93*a* of the template 93 is defined 5 mm larger in height H and width W than the defined size for the passport. This permits cutting the respective frames 93*a* off the recording paper along lines that extend inside the frames 93*a*, so as not to provide any margins outside the ID photos 95.

Also, a human subject or portrait 100 must be positioned in the ID photograph 95 such that the spacing S1 from the top side of the ID photograph 95 to the crown or top of the head of the human subject 100 is 7 mm, the length S2 from the crown to the chin of the human subject 100 is 27±2 mm, and the length Wh from the center of the face to either vertical side of the ID photograph 95 is 17±2 mm.

Because of these strict definition, it has conventionally been very difficult to synthesize or paste the image in the designated size and position in the template. With the conventional imaging system, some skill or several trial and error is required to paste the image in the template properly, and it takes a certain time. The imaging system 10 of the present invention makes it easy to synthesize the image in the template 93 for the passport.

Figure 8A:
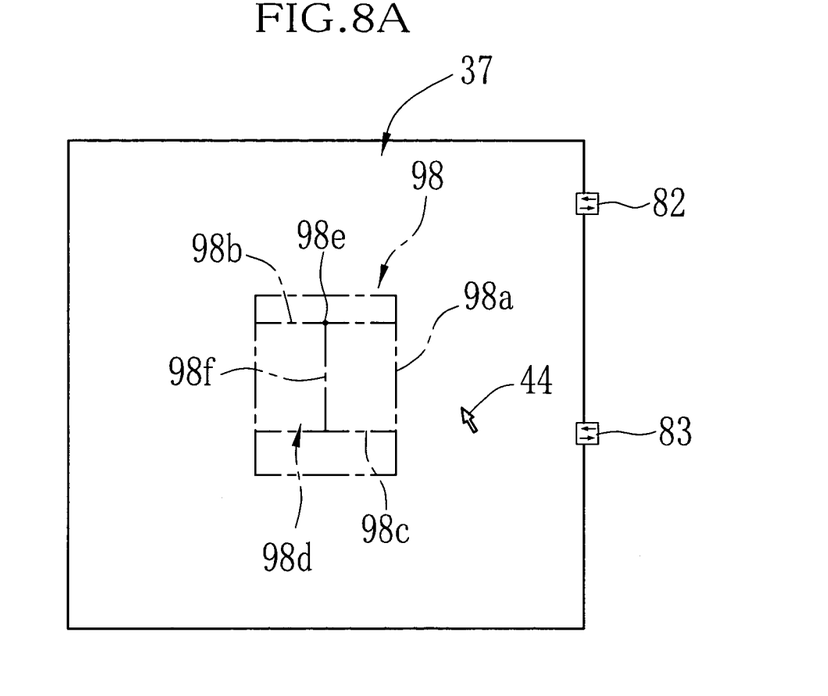
FIG. 8A is an explanatory diagram illustrating crop reference lines displayed on the main display area of the control screen when a template for ID photograph for the passport is selected.
Figure 8B:
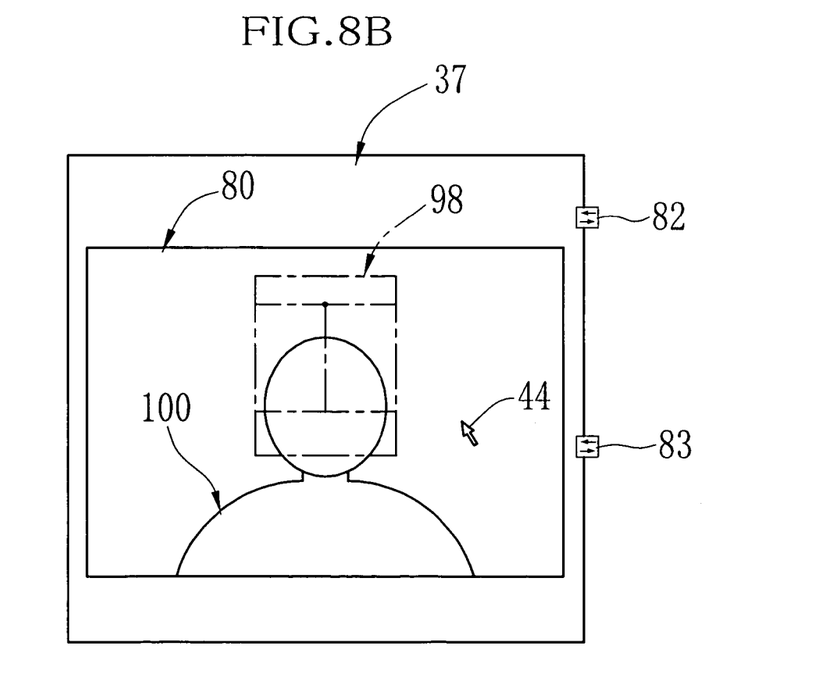
FIG. 8B is an explanatory diagram illustrating a display condition on the main display area, that appears when an image to paste in the template for the passport ID photograph is selected.

Specifically, when the template 93 for the ID photograph 95 of the passport is selected by operating the print size button 73, reference lines 98 for cropping are displayed on the main display area 37, as shown in FIG. 8A. The crop reference lines 98 consist of a crop boundary 98*a*, upper and lower horizontal lines 98*b* and 98*c*, a reference point 98*e* placed at a center on the upper horizontal line 98*b*, and a center line 98*f* extending vertically from the reference point 98*e* to the lower horizontal line 98*c*. When the image 80 to synthesize is selected from among a plurality of images displayed on the second sub display area 39, the crop reference lines 98 are displayed on the image 80 in the main display area 37, as shown in FIG. 8B.

The crop boundary 98*a* has a corresponding shape to the outline of the ID photograph 95 for the passport. That is, the aspect ratio of the crop boundary 98*a* is equal to that of the ID photograph 95, and the crop boundary 98*a* may be enlarged or reduced about the reference point while keeping the same aspect ratio. The crop boundary 98*a* is used for designating a cropping area of the image 80, as shown in FIG. 8B. The upper and lower horizontal lines 98*b* and 98*c* define an internal zone 98*d* within the crop boundary 98*a*, and move in cooperation with the crop boundary 98*a* to keep the proportions of the internal zone 98*d* to the crop boundary 98*a*. The upper and lower horizontal lines 98*b* and 98*c* are used for positioning the face of the human subject 100 of the image 80 in the predetermined layout for the passport in the ID photograph 95, the layout being described with reference to FIG. 7. The center line 98*f* is used for centering the face with the vertical center of in the ID photograph 95.

Figure 9A:
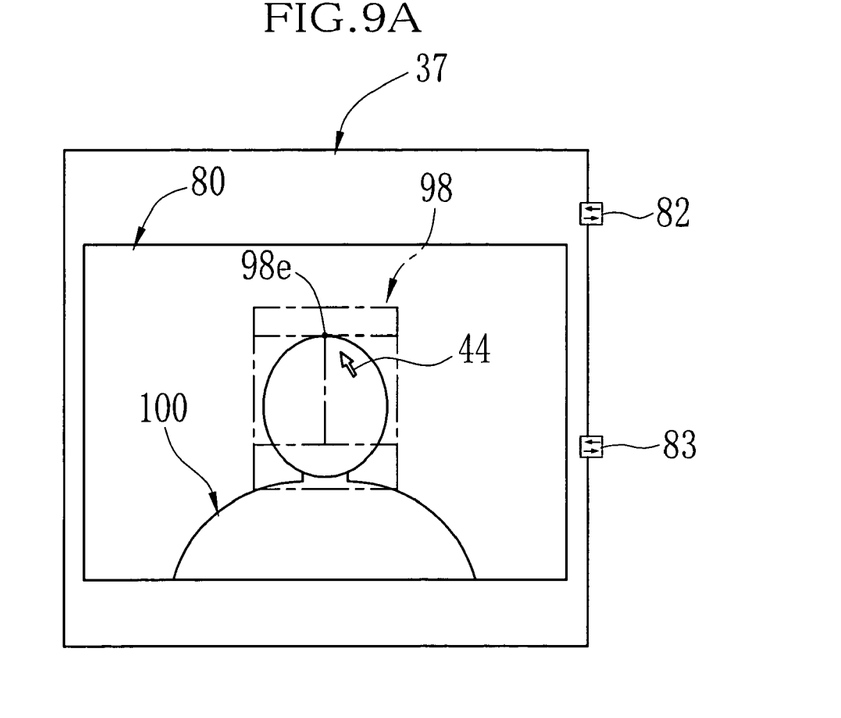
FIG. 9A is an explanatory diagram illustrating a display condition on the main display area, wherein a reference point in the crop reference lines is positioned at an appropriate point of the selected image.
Figure 9B:
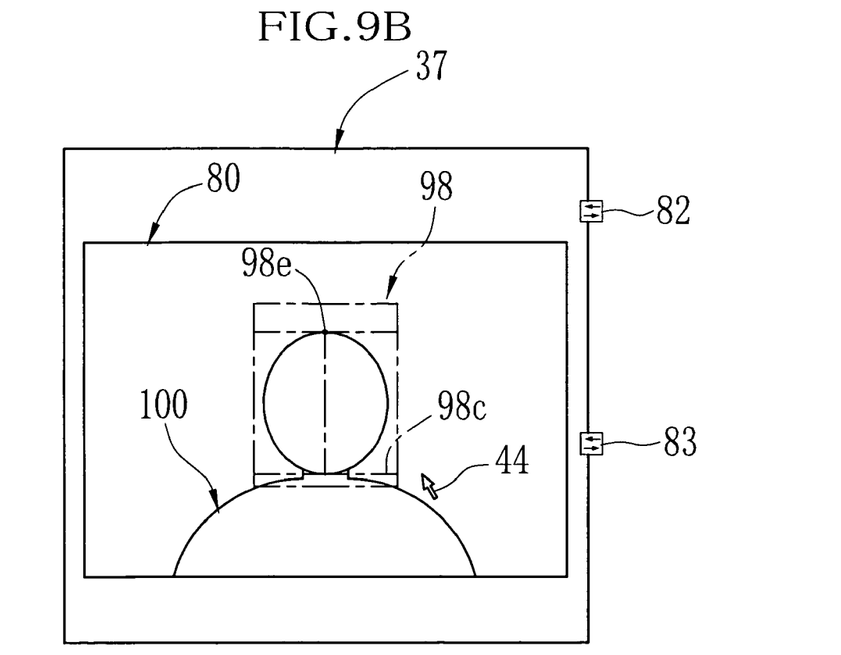
FIG. 9B is an explanatory diagram illustrating a display condition on the main display area, on the way to adjust the crop reference lines to a human subject of the selected image.

Then, the operator puts the pointer 44 on the reference point 98*e* and drags by operating the mouse 27, thereby to move the crop reference lines 98 together on the control screen 35 and place the reference point 98*e* at the crown of the human subject 100 of the image 80 to synthesize, as shown in FIG. 9A. Thereafter, the lower horizontal line 98*c* is dragged by the mouse 27 to bring it into alignment with the chin of the human subject 100, as shown in FIG. 9B.

Then, the crop boundary 98*a* is automatically enlarged or reduced in cooperation with the displacement of the lower horizontal line 98*c*, to recover the predetermined proportions to the internal zone 98*d*. In this way, as shown in FIG. 2, the crop reference lines 98 are finally positioned on the image 80 such that the size and the position of the human subject 100 are made proper for the ID photograph 95, relative to the cropping area of the image 80 that is defined by the crop boundary 98*a*.

After designating the cropping area of the image 80 in this way, the operator operates the pasting button 52 on the main control command display area 40. Then image data of the image 80 to synthesize, image data of the crop reference lines 98 and image data of the template 93 are fed in the image synthesizing section 24. The image synthesizing section 24 extracts image data of the cropping area of the image 80, wherein the cropping area includes an area bounded with the crop boundary 98a and a border area around the crop boundary 98a. The border area is defined in a constant width around the crop boundary 98a in correspondence with the marginal portion of the template frame 93a that is provided for cutting the individual ID photograph 95 without any margins out of the recording sheet, as set forth above with reference to FIG. 7.

The extracted image data is expanded or compressed to enlarge or reduce the cropped image in accordance with the size of each frame 93a of the template 93, i.e. 5.0 cm×4.0 cm. Thereafter, the extracted image data is synthesized with the image data of the template 93, such that the cropped image is pasted in the respective template frames 93a. On the basis of the synthesized image data produced from the extracted image data and the image data of the template 93, eight identical photographs 113 containing the selected human subject in the designated layout are printed in the predetermined frame size on a A5-size recording paper 114.

Figure 10:
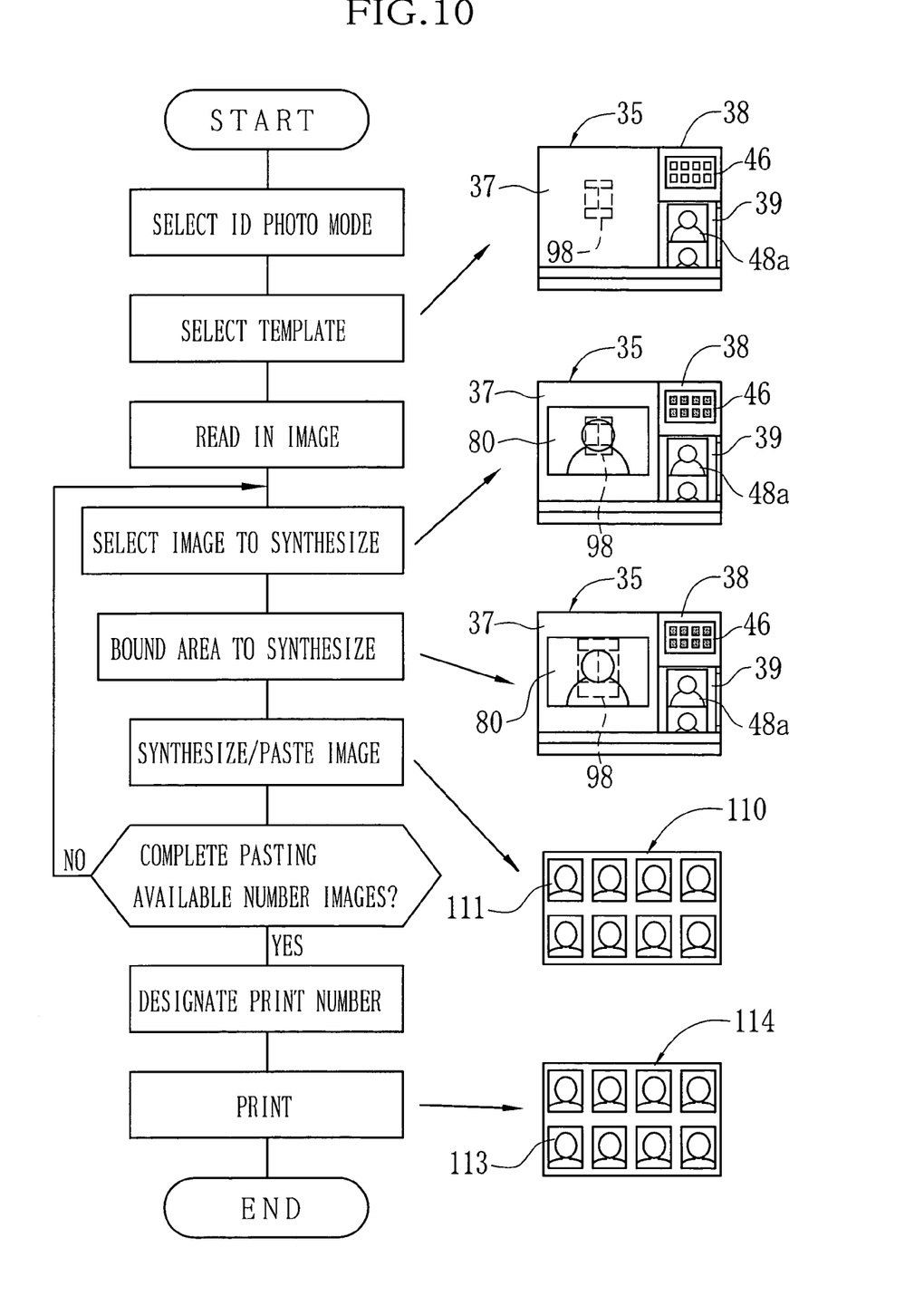
FIG. 10 is a flow chart illustrating a sequence for producing an ID photograph in the imaging system according to the present embodiment.

Now the operation of the imaging system 10 of the present embodiment will be described with reference to the flow chart of FIG. 10.

Upon turning on the imaging system 10, the imaging software is automatically started up in the personal computer 12. At the first stage of starting up the imaging software, any image is not displayed on the main display area 37, the first sub display area 38 and the second sub display area 39 as well.

The operator clicks on the menu button 70 of the menu selection display area 43 by use of the mouse 27 or the control panel 28, and select one of the menu options listed in the popped up menu box. For instance, the ID photo mode is selected. Then, the selected mode is displayed on the menu button 70.

Next, the operator clicks on the input selection button 71 of the menu selection display area 43, to select the input device from among the input device options listed in the popped up box. If for example the reflective scanner 14 is selected, then the list of different kinds of reflective originals or the list of color materials of the reflective originals is displayed in connection to the list of the input devices. Then, the operator selects the kind of the reflective original to read in the personal computer 12. For instance, "photo-print" is selected.

When the reflective scanner 14 is selected by the input selection button 71, the input size button 72 gets effective. With the input size button 72, the size of the reflective original to scan by the reflective scanner 14, that is, the scanning area is designated.

The print size button 73 of the menu selection display area 43 is operated for selecting the print size and the template. Upon clicking on the print size button 73, a list of available recording paper formats and a list of available templates are displayed. These lists may be alternatively displayed as samples on the main display area 37, as shown for example in FIG. 3. Since the samples 77a to 77d illustrate the outlines of the templates, the operator can visually discriminate between the templates and select the optimum template. To select one of the templates, the operator clicks on the sample of the template to select, e.g. the sample 77a of the template 93 for the ID photograph for the passport. Then, the sample 77a is reversed in color, to confirm the selection of that sample 77a. By clicking on the reversed sample 77a once again, the corresponding template to the sample 77a is decided to be used, so the layout image 46 of the corresponding template is displayed on the first sub display area 38. If the operator clicks on another sample while the sample 77a is displayed in the reversed color, the sample 77a returns to the normal display condition, and the clicked sample is displayed in the reversed color.

In the layout image 46 of the template displayed on the first sub display area 38, the frame to have an image pasted therein first is displayed in the reversed color. Where the same image is pasted in any frames of the template, all the frames are displayed in the reversed color. On the other hand, after the template is selected, a crop boundary or crop reference lines for designating an area of an image to synthesize with the template is displayed on the main display area 37. Assuming that the ID photo mode and the template 93 are selected in this instance, the crop reference lines 98 are displayed on the main display area 37.

Thereafter, the reflective original containing the image to scan is placed in the reflective scanner 14. Since the reflective scanner 14 is of the flat head type in the present embodiment, the reflective original is positioned on a stage of the reflective scanner 14, and is held flat and fixed in this position by closing a cover to sandwich the original between the stage and the cover.

When the read-in button 51 of the main control command display area 40 is operated after placing the reflective original in the reflective scanner 14, the personal computer 12 drives the reflective scanner 14 to read the image of the reflective original, and output image data of the reflective original to the personal computer 12 through the SCSI interface 30, and is sent to the image data converter 23 having the color correction circuit and the gradation processing circuit.

In the image data converter 23, the color correction circuit controls the color balance of the input image, taking different spectral characteristics of the reflective scanner 14, by carrying out γ-correction on red, green and blue (RGB) color signals of the image data with use of the coefficients that are predetermined for the reflective scanner 14. The gradation processing circuit corrects gradation of the image data by use of the look-up tables (LUT) which are prepared for the respective color materials read out through the reflective is selected. By operating the selection button 51 of the main control command display area 40 in this condition, the selected image is displayed in the large size on the main display area 37 as the image 80 to synthesize, as shown in FIG. 8B, and the crop reference lines 98, that has previously been displayed on the main display area 37, are displayed on the selected image 80.

Then, the operator puts the pointer 44 on the reference point 98e by operating the mouse 27, and drags the crop reference lines 98 on the control screen 35 to place the reference point 98e at the crown of the human subject 100 of the image 80 to synthesize, as shown in FIG. 9A. Thereby, the center line 98f is centered with the human subject 100. Thereafter, the lower horizontal line 98c is dragged to be aligned with the chin of the human subject 100, as shown in FIG. 9B. In this way, the size of the internal zone 98d is matched to the face of the human subject 100.

In cooperation with the dragging of the lower horizontal line 98c, the crop boundary 98a is automatically enlarged or reduced to maintain the predetermined proportions to the internal zone 98d. As the result, the crop reference lines 98 are finally positioned on the image 80 in the main display area 37 such that the position and the size of the face of the human subject 100 are proper for the ID photograph 95, relative to the cropping area of the image 80 that is defined by the crop boundary 98a. Accordingly, bounding the cropping area of the image 80 gets remarkably easier than conventional, even for the ID photograph for the passport where the position and the size scanner 14, such that the gradation is well reproduced by the printer 16. After correcting the gradation, the gradation processing circuit converts the image data into the YMC form, and write it on the RAM 20.

On the basis of the image data read out through the reflective scanner 14 and processed through the image data converter 23, a thumbnail of the read image is displayed on the second sub display area 39 of the control screen 35. If a plurality of reflective originals are read through the reflective scanner 14, or image data of a plurality of images is read out from a storage card, three of the read images are displayed at once as thumbnails on the second sub display area 39, and the scroll buttons 49 are displayed on the bottom of the second sub display area 39. By operating the scroll buttons 49, it is possible to check up all of the read images as thumbnails.

By operating the second display interchange button 83 that is displayed on the border between the main display area 37 and the second sub display area 39, the displayed contents are interchanged between the main display area 37 and the second sub display area 39, as shown in FIG. 5. Thereby, six thumbnails 48a to 48f may be displayed at once on the main display area 37 in a larger size than in the second sub display area 39.

To select one of the read images for use in synthesizing with the template, the operator clicks on the thumbnail of that image on the main display area 37 or on the second sub display area 39. Then the periphery of that thumbnail is displayed in the reversed color to indicate that the image of this thumbnail of the face of the portrait relative to the outline of the ID photograph are strictly defined.

After designating the cropping area of the image 80 by the crop boundary 98a, the operator operates the pasting button 52 on the main control command display area 40. Then the image data of the image 80 to synthesize, the image data of the crop reference lines 98 and the image data of the template 93 are fed in the image synthesizing section 24. Then, the image synthesizing section 24 extracts the image data of the cropped area of the image 80, including the area bounded by the crop boundary 98a and the border area around the crop boundary 98a. The extracted image data is enlarged or reduced in accordance with the size of each frame 93a of the template 93. Thereafter, the extracted image data is synthesized with the image data of the template 93, such that the cropped area of the image 80 is pasted in the respective template frames 93a.

When the synthesizing of the extracted image data with the image data of the template 93 is completed, i.e., the pasting of the cropped image in the template 93 is completed, a synthesized image 110 having eight frames 111 of the cropped image is displayed as the layout image 46 on the first sub display area 38. Also, a message "ready to print" is displayed on the message display area 42, for noticing the operator that the imaging system 10 is ready to print the synthesized image 110. To display the layout image in an enlarged size, the first display interchange button 82 is operated by the mouse 27. Then, the synthesized image is displayed in the enlarged size on the main display area 37, so the operator may check and confirm the conditions of the synthesized image.

If there is no need for correction, the operator operates the print number button 75 in the menu selection display area 43 to designate the requisite number of hard copies of the synthesized image, by selecting a number from among a list of numbers displayed in connection to the print number button 75 through the mouse 27, or by operating the control panel 28.

Thereafter when the operator operates the print button 53 in the main control command display are 40, the synthesized image data written in the RAM 20 is converted into print data and is fed in the printer 16, so the printer 16 prints out the designated number of hard copies 114 of the synthesized image 110. In this instance, eight identical photographs 113 containing the selected human subject in the designated layout are printed as the ID photographs for the passport in the predetermined frame size, i.e. 5.0 cm×4.0 cm, on the A5-size recording paper. By cutting the photographs 113 each individually into the size of 4.5 cm×3.5 cm, the ID photographs 95 containing the human subject 100 in the proper layout for the passport are produced.

Since the printer 16 is for the heat-developing photosensitive material in this embodiment, the synthesized image 110 is printed by projecting three-color laser beams onto a heat-developing photosensitive material. Thereafter the heat-developing photosensitive material having the image recorded thereon is laid on a photoreceptive material added with water, and is heated together, to form the recorded image as a positive image on the photoreceptive material. The photosensitive material is removed from the photoreceptive material, and the photoreceptive material having the positive image printed thereon is ejected as the hard copy 114 of the synthesized image 110.

Although the present embodiment has been described with respect to the case where the ID photographs for the passport are produced, the present invention is preferably applicable to other cases where the ID photographs of other formats are to be produced with use of other kinds of templates, or where the image is to be synthesized with other kinds of templates than those for the ID photographs.

In the above embodiment, the image to synthesize is selected after the template is selected. But it is also possible to select the image to synthesize before selecting the template. In that case, the image to synthesize is displayed first, and then the crop boundary is displayed on the image to synthesize upon selecting the template.

It is also possible to print out a cropped area of an image on a recording paper without synthesizing it with a template. It is also possible to synthesize images without using a template, by pasting a cropped area of each image in an appropriate position within a printing area that is defined in correspondence with a selected recording paper size and is displayed on the first sub display area.

Where any template is not used, a crop boundary is displayed on an image to synthesize, and is moved on the screen to position its reference point on an appropriate point of the image to synthesize. Thereafter, a crop boundary is enlarged or reduced while keeping the position of the reference point unchanged, so as to bound a cropping area of the image. Then, the image in the cropping area is cropped, and is enlarged or reduced in accordance with a designated print. Based on the image data processed in this way, a hard copy of the cropped area of the image is printed in the designated size.

Although the individual frames of the respective templates are rectangular in the above embodiment, the frames may have another shape, such as round, oblong, triangular, polygonal, rhombic, heart-shaped and so forth.

As the file reader, CD-ROM drive, MO disc drive and other large capacity data storage devices are usable besides the floppy disc drive.

The printer may be digital printers for use with ordinary silver halide photosensitive materials, ink-jet printers, color thermal printers, electronic photography type printer or other printers operating on image signals.

Thus, the present invention is not to be limited to the above embodiment but, on the contrary, various modifications will be possible to those skilled in the art without departing from the scope of claims appended hereto.

What is claimed is:

1. A method of cropping and synthesizing an image on a screen, comprising the steps of:
    displaying a crop boundary with a reference point on an image to synthesize on said screen, upon selecting a template having at least a frame, said crop boundary having a corresponding shape to that of said frame of said selected template and being variable in size while keeping the same shape and being centered on said reference point;
    moving said crop boundary on said screen through an operation device, to place said reference point of said crop boundary on an appropriate point of said image to synthesize;
    displaying reference lines inside said crop boundary, to define an internal zone within said crop boundary, said internal zone having a predetermined proportion and a predetermined position relative to said crop boundary;
    moving at least one of said reference lines on said screen through said operation device while keeping said reference point on said appropriate point of said displayed image, to adjust said internal zone to an appropriate portion of said displayed image, wherein said crop boundary is automatically enlarged or reduced in cooperation with the movement of said reference line, so as to keep said internal zone in the predetermined proportion and position relative to said crop boundary;
    thereafter enlarging or reducing said crop boundary about said reference point, to bound an appropriate area of said image to synthesize;
    cropping an image of said bounded area; and
    pasting said cropped image in said frame of said template after enlarging or reducing said cropped image in accordance with the size of said frame of said template to produce a synthesized image.

2. A method as recited in claim 1, wherein said reference point is located inside said crop boundary at a constant position relative to said crop boundary.

3. A method as recited in claim 1, wherein said cropped image is automatically enlarged or reduced in accordance with the size of said frame of said selected template.

4. The method of claim 1, wherein the appropriate point of said image corresponds to a region of interest selectable by a user.

5. The method of claim 1, wherein moving said crop boundary comprises a user operation of the operation device.

6. The method of claim 1, wherein the cropped image maintains its original relative width to height ratio.

7. A method as recited in claim 1, further comprising:
    printing hard copies of said synthesized image;
    wherein said synthesized image is displayed in a sub display area provided in said screen.

8. A method as recited in claim 7, further comprising:
    designating the number of said hard copies before printing said hard copies.

9. An image cropping method comprising the steps of:
    displaying an image on said screen;
    displaying a crop boundary with a reference point on said image on said screen, upon designating a frame size, said crop boundary having an equal aspect ratio to that of said designated frame size and being variable in size while keeping the same aspect ratio and being centered on said reference point;
    displaying reference lines inside said crop boundary, to define an internal zone within said crop boundary, said internal zone having a predetermined proportion and a predetermined position relative to said crop boundary; and
    moving said crop boundary on said screen through an operation device, to place a predetermined reference point of said crop boundary on an appropriate point of said image;
    moving at least one of said reference lines on said screen through said operation device while keeping said reference point on said appropriate point of said displayed image, to adjust said internal zone to an appropriate portion of said displayed image, wherein said crop boundary is automatically enlarged or reduced in cooperation with the movement of said reference line, so as to keep said internal zone in the predetermined proportion and position relative to said crop boundary;
    thereafter enlarging or reducing said crop boundary about said reference point, to bound an appropriate area of said image;
    cropping an image of said bounded area; and
    enlarging or reducing said cropped image in accordance with said frame size.

10. The method of claim 9, wherein the appropriate point of said image corresponds to a region of interest selectable by a user.

11. An image cropping method comprising the steps of:
    displaying an image on said screen;
    displaying a crop boundary with a reference point on said image on said screen, upon designating a frame size, said crop boundary having an equal aspect ratio to that of said designated frame size and being variable in size while keeping the same aspect ratio and being centered on said reference point;
    displaying reference lines inside said crop boundary, to define an internal zone within said crop boundary, said internal zone having a predetermined proportion and a predetermined position relative to said crop boundary;
    moving said crop boundary together with said reference lines on said screen through an operation device, to place said reference point of said crop boundary on an appropriate point of said image;
    moving at least one of said reference lines on said screen through said operation device while keeping said reference point on said appropriate point of said image to synthesize, to adjust said internal zone to a portion of said image;
    enlarging or reducing said crop boundary about said reference point automatically in cooperation with the movement of said reference line, so as to keep said internal zone in the predetermined proportion and position relative to said crop boundary;

cropping an image of an area of said image that is bounded by said crop boundary; and enlarging or reducing said cropped image in accordance with said frame size.

12. The method of claim 11, wherein the appropriate point of said image corresponds to a region of interest selectable by a user.

13. The method of claim 11, wherein the reference lines are movable with respect to locations of the image.

14. The method of claim 11, wherein the reference lines are formed to divide a single source image into sub-regions.

15. An imaging apparatus comprising:

a template selecting device for selecting a template from among different kinds of templates;

a display device for displaying an image to synthesize and a crop boundary having a corresponding shape to that of a frame of said selected template;

an operation device for moving said crop boundary on said screen, to place a reference point of said crop boundary on an appropriate point of said image to synthesize, and for enlarging or reducing said crop boundary about said predetermined reference point while keeping said crop boundary in the same shape and keeping said reference point on said appropriate point of said image;

a cropping device for cropping an image from an area of said image to synthesize, said area being bounded by said crop boundary; and an image synthesizing device for enlarging or reducing said cropped image in accordance with the size of said frame of said template, and thereafter pasting said cropped image in said frame of said template, to produce a synthesized image;

wherein said display device further displays reference lines inside said crop boundary, to define an internal zone within said crop boundary, said internal zone having a predetermined proportion and a predetermined position relative to said crop boundary; and wherein at least one of said reference lines may be moved on said screen through said operation device while keeping said reference point on said appropriate point of said image to synthesize, and said crop boundary is automatically enlarged or reduced in cooperation with the movement of said reference line, so as to keep said internal zone in the predetermined proportion and position to said crop boundary.

16. An imaging apparatus as recited in claim 15, wherein said display device displays samples of said different kinds of templates on said screen in a small size before one of said templates is selected.

17. An imaging apparatus as recited in claim 15, wherein said display device displays a plurality of images in a small size on said screen, among which said image to synthesize may be selected from and is displayed in a large size after being selected.

18. An imaging apparatus as recited in claim 15, wherein said display device displays said synthesized image on said screen after said image synthesizing device completes pasting said cropped image in said frame of said template.

19. An imaging apparatus as recited in claim 15, further comprising an image input device for inputting image data, and a printer for printing out said synthesized image.

20. The apparatus of claim 15, wherein the appropriate point of said image corresponds to a region of interest selectable by a user.

21. The apparatus of claim 15, wherein each template includes plural image locations.

22. The apparatus of claim 21, wherein the display device displays plural different images in the plural image locations of the selected template according to results of the image synthesizing device of pasted and cropped plural images.

23. An apparatus as recited in claim 15, wherein a image to be printed s displayed in a sub display area provided in said screen.

24. An apparatus as recited in claim 23, wherein said display device displays an area where the number of hard copies of said image to be printed is specified.

* * * * *